DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 12, 1970

874 O.G. 369

T874,003

ADDITIVE COMPOSITION

Clarence E. Tholstrup and Alan Bell, both of Box 511, Kingsport, Tenn. 37662

Continuation of application Ser. No. 664,965, Sept. 1, 1967. This application Nov. 20, 1969, Ser. No. 872,443

**Int. Cl. C08g *51/02***

U.S. Cl. 260—40

No Drawing. 15 Pages Specification

Additives (such as stabilizers, pigments, slip agents, and dyes) may be uniformly incorporated in moldable, fiber-, and film-forming polyesters by mixing the additive with a copolyester having a melting point of from about 150 to 240° C. and an inherent viscosity of at least 0.5 and being a copolyester of (1) from about 75 to about 95 mole percent of ethylene glycol, (2) from about 5 to about 25 mole percent of a diol selected from the group consisting of aliphatic diols having 4 to 10 carbon atoms and cycloaliphatic diols having 4 to 10 carbon atoms, and (3) at least one difunctional dicarboxylic acid, and then blending the resultant additive composition with said polyester.